United States Patent
Mandala et al.

(10) Patent No.: US 10,592,482 B2
(45) Date of Patent: Mar. 17, 2020

(54) METHOD AND SYSTEM FOR IDENTIFYING AND ANALYZING HIDDEN DATA RELATIONSHIPS IN DATABASES

(71) Applicant: Cognizant Technology Solutions India Pvt. Ltd., Chennai (IN)

(72) Inventors: Gopinath Mandala, Chennai (IN); Prasad Chand Uppuleti, Vijayawada (IN); Bezawada Harshavardhan, Ongole (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 1006 days.

(21) Appl. No.: 15/080,016

(22) Filed: Mar. 24, 2016

(65) Prior Publication Data

US 2017/0185635 A1  Jun. 29, 2017

(30) Foreign Application Priority Data

Dec. 29, 2015 (IN) ............................ 7032/CHE/2015

(51) Int. Cl.
*G06F 16/00* (2019.01)
*G06F 16/21* (2019.01)
*G06F 16/2453* (2019.01)

(52) U.S. Cl.
CPC ...... *G06F 16/212* (2019.01); *G06F 16/24537* (2019.01)

(58) Field of Classification Search
CPC .......................... G06F 16/212; G06F 16/24537
USPC ...................................................... 707/714
See application file for complete search history.

(56) References Cited

U.S. PATENT DOCUMENTS

| 5,734,887 | A * | 3/1998 | Kingberg | .............. G06F 16/284 |
| 7,185,317 | B2 | 2/2007 | Fish | |
| 7,305,656 | B2 | 12/2007 | Fish | |
| 8,165,989 | B2 | 4/2012 | Dettinger et al. | |
| 2006/0059107 | A1 * | 3/2006 | Elmore | .................. G06Q 10/06 705/64 |

(Continued)

OTHER PUBLICATIONS

CA Erwin, "CA ERwin® Data Modeler", URL: http://support.ca.com/cadocs/0/e002953e.pdf, 2009.

(Continued)

*Primary Examiner* — Monica M Pyo
(74) *Attorney, Agent, or Firm* — Cantor Colburn LLP

(57) ABSTRACT

Method and system for identifying and analysing hidden relationships in application databases is provided. During a database session database query language statements (DQLS) are retrieved from log tables in application databases to analyze and identify join indicators. Join indicators represent data fields from two or more tables which are joined using values common to each data field. Based on identified join indicators, data definition language (DDL) file is generated including relationship between two or more tables. Above steps are repeated until all DQLS in log tables are analyzed. Thereafter it is ascertained if content of created DDL file is defined in database schema (DS). DS is represented in physical data models of application databases. If it is not defined in the database schema, a logical data definition language file is generated based on generated DDL file to update logical data model, which represents hidden relationships between tables in application databases.

12 Claims, 4 Drawing Sheets

(56) References Cited

U.S. PATENT DOCUMENTS

| | | | | |
|---|---|---|---|---|
| 2008/0069132 A1* | 3/2008 | Ellard | ............... | G06F 16/252 |
| | | | | 370/427 |
| 2012/0290527 A1* | 11/2012 | Yalamanchilli | ....... | G06F 16/283 |
| | | | | 707/602 |
| 2014/0095502 A1* | 4/2014 | Ziauddin | ............... | G06F 16/283 |
| | | | | 707/737 |

OTHER PUBLICATIONS

Grid—Tools, "Grid—Tools Test Data Management", URL: http://www.infapartner.cz/upload/BLOOR-GridTools-TestDataManagement.pdf, 2011.

Informatica, "Test Data Management", (htttps://www.informatica.com/products/data-security/test-data-management.html) 2015.

International Business Machines, "InfoSphere Optim Test Data ManagementSystems", URL: http://www-03.ibm.com/software/products/en/infosphere-optim-test-data-management, 2010.

Schemaspy, Graphical Database Schema Metadata Browser, URL: http://schemaspy.sourceforge.net/, 2005.

* cited by examiner

METHOD AND SYSTEM FOR IDENTIFYING AND ANALYZING HIDDEN DATA RELATIONSHIPS IN DATABASES

CROSS REFERENCE TO RELATED APPLICATION

This application is related to and claims the benefit of Indian Patent Application Number 7032/CHE/2015 filed on Dec. 29, 2015, the contents of which are herein incorporated by reference in the entirety.

FIELD OF THE INVENTION

The present invention relates generally to the field of accessing and analyzing data stored in databases and more specifically to a method and system for identifying and analysing hidden data relationships in databases.

BACKGROUND OF THE INVENTION

Day by day, the need for efficient data management is increasing manifold, more so, with proliferation of data and data dependency in an enterprise set up. Efficient data management is a prerequisite for storage and retrieval of accurate data. Various database management systems such as relational database management systems (RDBMS) are typically employed in enterprises for storing, organizing and accessing data in databases. Also, currently, various testing tools are employed as part of data management for checking accuracy of stored and retrieved data associated with various applications.

For instance, web applications (also referred as application(s)) are extensively used as a communications means as well as for performing various activities in an enterprise. These web applications rely on databases that store data associated with these applications, and are in turn managed by one or more database management systems. Typically, an application has rules defined at different layers of the application architecture, namely, data layer, application layer and the user interface layer for storage and access of information stored in the database. The data layer provides for information related to the manner in which data is organized in the databases. If the databases are managed using RDBMS, information related to database tables in which data is organized, logic used for navigating the database etc. are defined in the data layer. As mentioned above, data layer also provides for rules associated with storage and access of data in the database tables.

However, most of the applications do not have all the rules defined at the data layer. In other words, relationship between data stored in the tables may not be defined at the data layer. Conventional test data management tools rely on underlying database relationships for performing various activities as part of application testing, such as data sub-setting, data masking, data archiving and data generation etc. In the absence of rules defined in the data layer, test data management tools may not be able to identify exact relationship between data/tables that the application uses for various business transactions. In such a scenario, test data management experts need to obtain this information from an application subject matter expert, or data architect, but, they may lack in knowledge of such information. Further, in most cases these applications are developed and maintained over a period of many years with multiple developers modifying or maintaining the changes. A lot of information on those changes are usually tacit and are lost with change in personnel over the years. Even though, some conventional tools may rely on data or meta-data patterns to identify logical relationships between data/tables, limitations have been observed in identifying exact relationship that the application uses as part of business transaction. This results in lack of complete information of data related to business transactions, which in turn results in reduced accuracy while performing test data management activities. Moreover, identifying rules at data layer for analyzing relationships between tables manually using the tools and taking support from subject matter experts in the absence of such rules is a cumbersome process.

Furthermore, there are tools that are used for reverse engineering system and process flows, business rules and data lineage in order to identify relationship between various data used in business transactions. These tools work on the application code or log files and figure out relationships between various business entities. If the application code is not available or encrypted as is generally the case with third party vendor products, the tool might not be able to provide accurate information. Also, these tools work at the application level and as such the output can sometimes be complex and incomprehensible.

In light of the above drawbacks, there is a need for a method and system for identifying correct relations between data/tables in a database for accurate data storage or retrieval activities during a business transaction. There is also a need for a method and system that provides for an automated manner of identifying and analyzing relationships between data/tables stored in databases that are not traceable by accessing the data layer. Also, there is a need for a method and system for automating identification of hidden relationships in application database $110s$. Further, there is a need for a method and system that works at the transaction level instead of the application level such that interpretation of the output is easy and efficient.

SUMMARY OF THE INVENTION

A method for identifying and analysing hidden relationships in application databases, via a database trace and analysis tool in communication with a processor that is programmed to execute program instructions of the database trace and analysis tool stored in a memory is provided. The method comprises analyzing one or more database query language statements, during a database session, to identify a join indicator in each of the one or more database query language statements retrieved from one or more log tables in an application database. The join indicator represents data fields from two or more tables which are joined using a value that is common to each data field. Further, the method comprises generating a data definition language file that includes relationship between the two or more tables based on the identified join indicators. The method further comprises repeating the above steps until all the database query language statements in the log tables are analyzed.

Furthermore, the method comprises ascertaining if content of the created data definition language file is defined in a database schema of the application database. The database schema is represented in a physical data model. Finally, the method comprises generating a logical data definition language file, based on the generated data definition language file, if content of the created data definition language file is not defined in the database schema, to update a logical data model with the content of the logical data definition language file, whereby the logical data model represents hidden relationships between tables in the application database.

A system for identifying and analysing hidden relationships in application databases is provided. The system is in communication with at least one application database and a data modeling system. The system comprises a processor executing program instructions stored in a memory. The system further comprises a data analysis engine in communication with the processor and configured to analyze one or more database query language statements, during a database session, to identify a join indicator in each of the one or more database query language statements retrieved from one or more log tables in an application database. The join indicator represents data fields from two or more tables which are joined using a value that is common to each data field. The data analysis engine is further configured to generate a data definition language file that includes relationship between the two or more tables based on the identified join indicators. Further, the data analysis engine is configured to ascertain if content of the created data definition language file is defined in a database schema of the application database which is represented in a physical data model. The data analysis engine performs the analysis and generation until all the database query language statements in the log tables are analyzed. The system further comprises a logical data definition language generation engine in communication with the processor and configured to generate a logical data definition language file, based on the created data definition language file, if content of the created data definition language file is not defined in the database schema to update a logical data model, in the data modeling system, with the content of the logical data definition language file, whereby the logical data model represents hidden relationships between tables in the application database.

A computer program product comprising a non-transitory computer-readable medium having computer-readable program code stored thereon is provided. The computer-readable program code comprises instructions that, when executed by a processor, cause the processor to analyze one or more database query language statements, during a database session, to identify a join indicator in each of the one or more database query language statements retrieved from one or more log tables in an application database. The join indicator represents data fields from two or more tables which are joined using a value that is common to each data field. The computer-readable program code further comprises instructions that, when executed by a processor, cause the processor to generate a data definition language file that includes relationship between the two or more tables based on the identified join indicators. Further, the computer-readable program code comprises instructions that, when executed by a processor, cause the processor to repeat the above steps until all the database query language statements in the log tables are analyzed. Furthermore, the computer-readable program code comprises instructions that, when executed by a processor, cause the processor to ascertain if content of the created data definition language file is defined in a database schema of the application database which is represented in a physical data model. Furthermore, the computer-readable program code comprises instructions that, when executed by a processor, cause the processor to generate a logical data definition language file, based on the created data definition language file, if content of the created data definition language file is not defined in the database schema to update a logical data model with the content of the logical data definition language file, whereby the logical data model represents hidden relationships between tables in the application database.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method is provided for identification and analysis of hidden data relationships in a database. The invention provides for identifying exact relationships between tables and columns stored in a database, that are otherwise not defined in the data model representing the database layer of the application architecture. The invention provides for an automated mechanism to efficiently retrieve correct and accurate details of relationship between tables and columns and update the data model with identified data relationships that were previously hidden.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
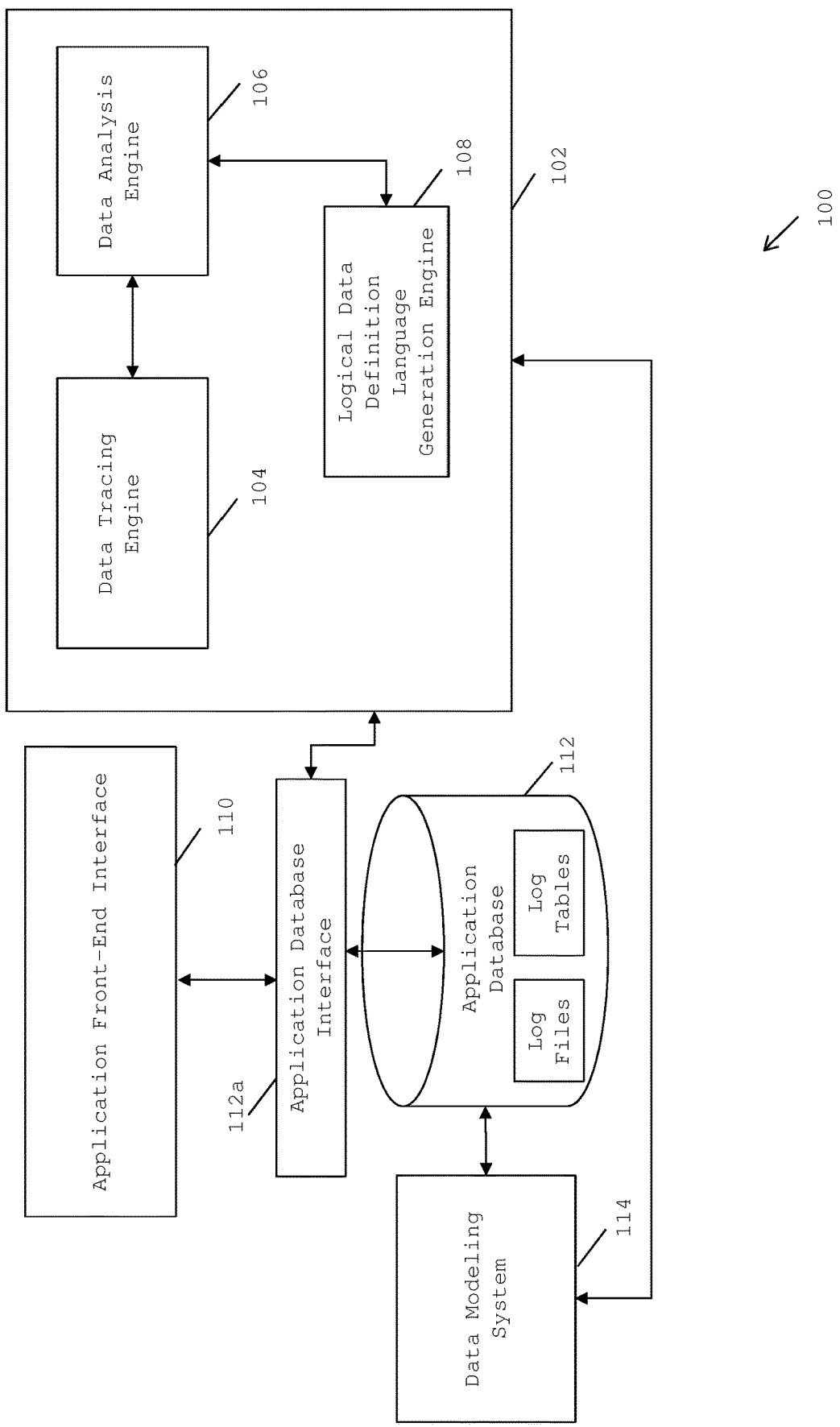
FIG. 1 illustrates a block diagram of a system for identifying and analyzing hidden data relationships in databases, in accordance with various embodiments of the present invention.

FIG. 1 illustrates a block diagram of a system for identifying and analyzing hidden data relationships in databases, in accordance with various embodiments of the present invention. The system 102 comprises a data tracing engine 104, a data analysis engine 106, and a logical data definition language generation engine 108. The data tracing engine 104, the data analysis engine 106 and the logical data definition language generation unit 108 execute various functionalities via a processor using program instructions stored in a memory. The processor is a specific purpose processor that is programmed to execute specific instructions stored in the memory for carrying out the particular functionalities of the data tracing engine 104, the data analysis engine 106 and the logical data definition language generation engine 108 in accordance with various embodiments of the present invention. An exemplary computer system comprising the programmed processor and memory and various other hardware components required for implementing the various embodiments of the present invention is described in FIG. 3 of the specification.

Various applications are used, for instance, in enterprises for carrying out one or more activities for various tasks that are carried out within the enterprises. For example, distributed applications such as web applications, web applications using hibernate framework etc. are used in enterprises to communicate, and manage information. The web applications, as it is known, rely on databases that store data associated with these web applications, and are in turn managed by one or more database management systems. In a database management system, such as a relational database management system, an application accesses a database by issuing a database access request. Examples of databases may include IBM DB2, Microsoft's SQL Server, Oracle databases etc. The requests include instructions to read, modify, add or retrieve data stored in the databases. The requests are made using database query languages. For example, the requests may be in the form of a high level-query language such as Structured Query Language (SQL). The SQL requests or queries are commands that permit finding location of data, selecting data, inserting data, updating data in the relational databases in response to a database access request issued by an application.

In an embodiment of the present invention, business transactions are carried out using an application via a front-end interface 110 of the application. The application front-end interface 110 allows users to access the application data stored in a database (referred as application database 112) for carrying out the business transaction. The application interacts with the application database 112 using database query language commands, such as SQL commands as mentioned above. The application database 112 captures the database query language commands of the business transaction and stores the database query language commands in one or more electronic files.

Referring to FIG. 1, the system 102 is a stand-alone tool and communicates electronically with the application database 112 to perform various operations in accordance with various embodiments of the present invention. In an embodiment of the present invention, the system 102 is a database tracing and analysis tool which is hosted in a client machine (not shown) that communicates with the application database 112 via an application database interface 112a. In an exemplary embodiment of the present invention, the system 102 is developed using a computing platform such as a Java platform (JDK 1.7). The input to the system 102 is received from the application database 112. The output of the system 102 is operatively connected to a data modeling system 114. The data modeling system 114 is accessed by test data management system (not shown) which uses the output from the system 102 to carry out accurate testing of the application. The details of the operation are mentioned herein below.

In operation, in an embodiment of the present invention, the data tracing engine 104 of the system 102 is invoked automatically during a database session i.e. when the application accesses the application database 112 during a transaction. The data tracing engine 104 then interacts with the application database 112 via the application database interface 112a to retrieve the electronic files from the application database 112. The electronic files (also referred as log files) contain information for all database query language statements that are executed during the database session. The data tracing engine 104 then loads the contents of the log files into a log table within the application database 112 (or in a separate staging environment). The log table provides information related to identity, sequence, origin and effects of different events that are encountered during the course of execution of the database session.

In an exemplary embodiment of the present invention, the application is a retail sales analysis application that provides for various objects such as a dashboard icon, a promotion icon, a store icon, a product icon, a sale transaction icon, a report icon etc. on the application front-end interface 110a. The user may carry out various transactions by accessing the icons, such as an add store transaction for adding a new store selectable from a drop down menu indicating multiple store options, an edit store transaction for modifying an existing store information, generate sales history transaction for generating historical data related to sales of store inventory etc. The application accesses the application database 112 in order to retrieve data relevant to the transactions. The data may include, store identification number, region name, store name, store type, item name etc. During transactions, a trace feature in the application database 112 is invoked and one or more log files are electronically generated during the transactions. The SQL statements issued as part of access request are captured by the application database 112 and stored in the one or more log files. The data tracing engine 104 monitors the application database 112 and is provided access to the electronically generated log files to read the contents of the log files.

After invocation, the data trace engine 104 retrieves the log files containing the data query language statements stored in the application database 112. From the retrieved log files the data trace engine 104 obtains information related to the database session. The data trace engine 104 then loads the contents of the log files into the log table in the application database 112. In an exemplary embodiment of the present invention, the data trace engine 104 uses the standard system stored procedures of the application database 112 to load the data query language statements from the log files into the log tables. The data trace engine 104 then sends the log contents to the data analysis engine 106 of the system 102.

In an embodiment of the present invention, the data analysis engine 106 processes the database session information to access the corresponding log files stored in the log tables. The data analysis engine 106 then analyses the data query language statements in the log files to determine relationships between various tables and columns of the application database 112. In particular, in an exemplary embodiment of the present invention, the data analysis engine 106 analyses the data query language statements to identify a join indicator that establishes a link between two or more tables that can be combined based on common values. For example, the data analysis engine 106 identifies a table X and a table Y in the application database 112 to be related based on the join indicator. The table X contains various details of a particular store, such as, store identification number, store name, store address etc. Table Y contains other details of the same store, such as store identification number, item identification number, item name, item price etc. The data analysis engine 106 determines that the table X and table Y have fields that are linked to a common value i.e. the same store identification number. Therefore, based on the join indicator the data analysis engine 106 determines tables and columns with common values.

In an exemplary embodiment of the present invention, the data analysis engine 106 parses each of the SQL statements iteratively in the log table to determine any SQL Join operations. Join operations are performed in the execution of SQL requests or queries for combining fields from two or more tables. The data analysis engine 106 identifies the SQL Join operation as the join indicator that represents fields from two or more tables which are joined using values that are common to each field. Based on the identified SQL Join operation, the data analysis engine 106 determines if the relationship is already existing inside the application database 112. If the data analysis engine 106 determines that the relationship is not defined in the application database 112, then the data analysis engine 106 identifies the tables and columns with common values as the hidden relationships.

The data analysis engine 106 then generates a data definition language (DDL) file that represents the list of tables and columns and the relationships between the tables and columns. The DDL file therefore represents the identified hidden relationships. Each time the data analysis engine 106 discovers a hidden relationship based on the SQL Join Operation, the data analysis engine 106 appends the DDL file to the corresponding SQL statement. In various embodiments of the present invention, the data analysis engine 106 repeats the entire process of identifying hidden relationships, generating DDL file and appending the DDL file to corresponding SQL statement until there are no more SQL statements that need to be parsed from the log table.

In an embodiment of the present invention, the logical data definition language engine 108 receives the DDL file from the data analysis engine 106 and analyses the DDL file. The analysis is performed to ascertain the list of tables and columns that are linked based on one or more common values to check if the relationship is already defined in the database layer of the application architecture. In an exemplary embodiment of the present invention, the database layer is represented in the form of a physical data model. The physical data model is stored in the data modeling system 114 which is connected to the application database 112. The physical data model is specific to the application database 112 and represents the database schema of the application database 112. The database schema defines the tables, columns and relationships between the tables and columns along with other information related to the application database 112. The logical data definition language generation engine 108 checks the physical data model to determine if the determined relationship between the table and column is defined in the database schema. In the absence of such definition, the logical data definition language engine 108 marks the DDL as missing and generates a logical data definition language file based on the DDL file. The logical data definition language file represents the missing relationships on the tables that are present in the DDL file.

In another exemplary embodiment of the present invention, the data modeling system 114 comprises entity-relationship models (referred as logical data model) that are independent of the application database 112 details. The logical data model represents the enterprise entities, their data and relationship among them. The logical data definition language engine 106 updates the logical data model with the information in the logical data definition language file. The updated logical data model provides logical relationship of the tables and columns whose relationship information is hidden in the physical data model.

Advantageously, the updated logical data model generated by the system 102 facilitates the test data management system (not shown) experts to establish exact and hidden relationships between tables and columns stored in the application database 112, which is otherwise not obtainable from the database layer of the application architecture. Based on the updated logical data model, the test data management experts can generate complete and accurate data for performing testing activities for the application using the existing relationships as well as the identified hidden relationships between tables and columns. Therefore, dependencies on availability of application subject matter experts or data architect to provide the missing or hidden information on data relationships is removed. Further, various activities such as data refresh and data generation can be performed effectively as required information is available with the system 102 which can be readily accessed and validated. Also, the system 102 facilitates an automated manner of generating test reports that satisfies all the business rules as it facilitates in presenting complete information of data stored in the application database 112.

Figure 2A:
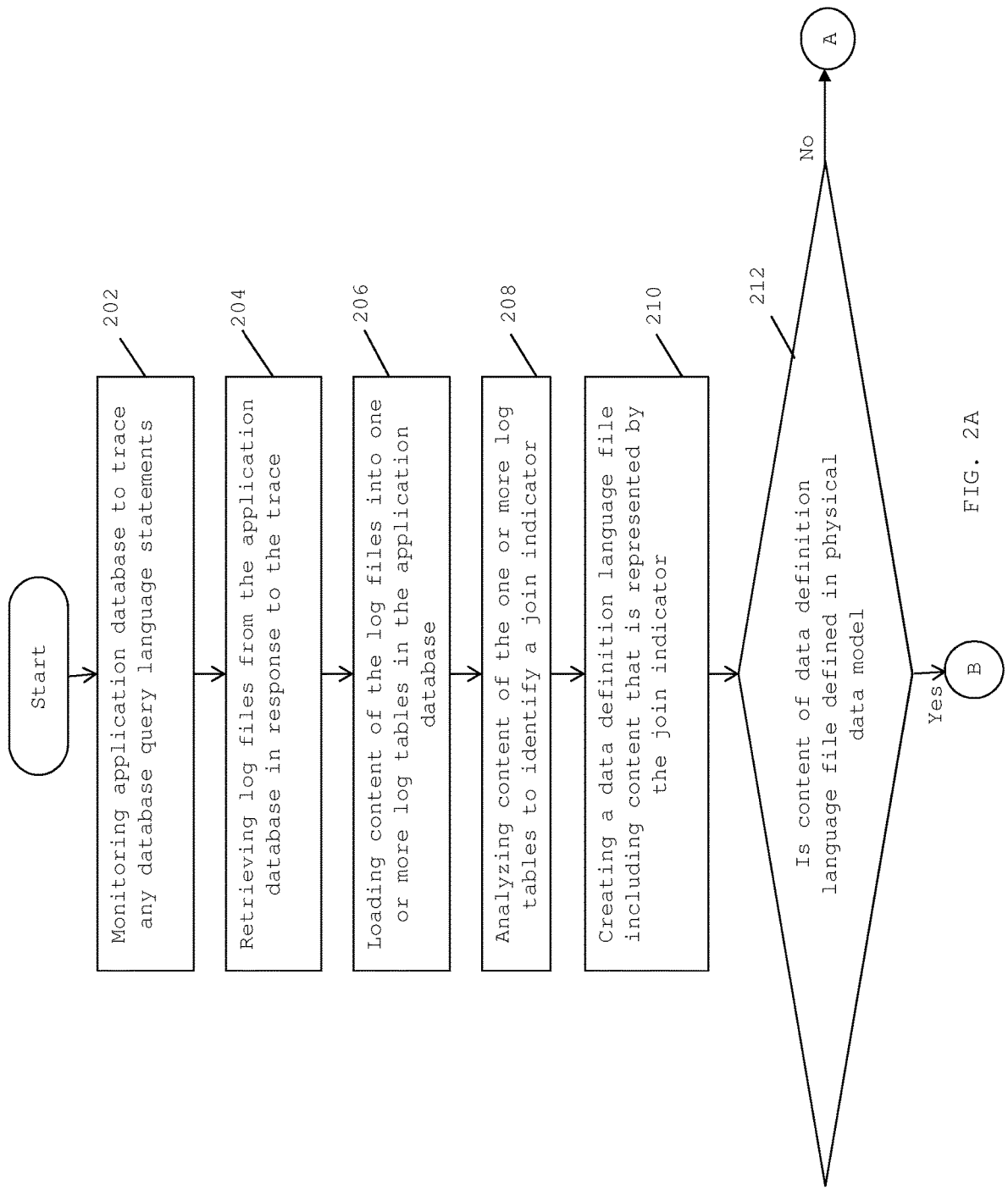
FIGS. 2A and 2B illustrates a flowchart for identifying and analyzing hidden data relationships in databases, in accordance with various embodiments of the present invention.
Figure 2B:
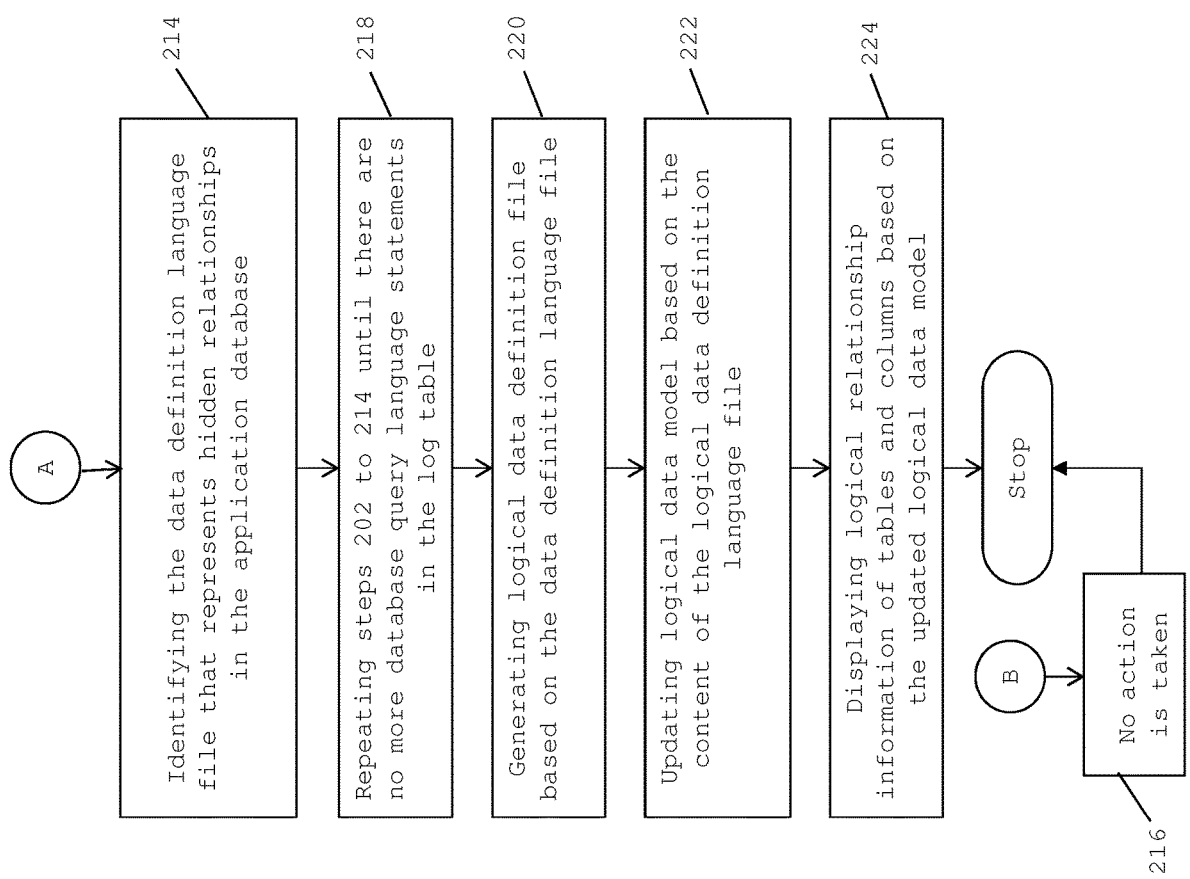

FIGS. 2A and 2B illustrates a flowchart for identifying and analyzing hidden data relationships in databases, in accordance with various embodiments of the present invention.

At step 202, an application database is monitored during a database session to trace any database query language statements. In an embodiment of the present invention, database session is created when an application accesses the application database during a transaction performed by the user, using a front-end interface of the application. During the database session, a trace feature is invoked on the application database 112 which generates log files. The log files contain all the database query language statements for each of the transactions. The application database is monitored to determine any database query language command received from the application. After the query language commands are determined, the log files are traced for all database query language statements associated with the transaction.

At step 204, log files are retrieved from the application database in response to the trace. In an embodiment of the present invention, the log files are electronic files that contain information of all database query language statements, such as, SQL that are executed during the database session. The database query language statements include, but are not limited to, identity, sequence, origin and effects of different events that are encountered during the course of execution of the database session. Information related to the database session may therefore be obtained from the log files.

At step 206, content of the log files are loaded into one or more log tables in the application database. In an embodiment of the present invention, the one or more log tables containing the log files provide information related to the database query language statements.

At step 208, content of the one or more log tables are analyzed to identify a join indicator. In an embodiment of the present invention, the database query language statements in the one or more log files are analyzed to determine the join indicator which is representative of data fields from two or more tables that are combined using values common to each data field. In an exemplary embodiment of the present invention, database query language, such as, SQL statements are parsed to determine SQL Join operations. Join operations are performed in the execution of SQL requests or queries for combining data fields from two or more tables. In this exemplary embodiment, the SQL Join operation is the join indicator which determines the tables and columns that are linked based on a common value.

At step 210, a data definition language file is created including content that is represented by the join indicator. In an embodiment of the present invention, the data definition language file includes the list of tables and columns and information related to the relationships between the tables and columns with common values.

At step 212, content of the data definition language file is analyzed to check if the analyzed content is defined in a physical data model. In an embodiment of the present invention, the physical data model represents database schema of the application database. The database schema defines the tables, columns and relationships between the tables and columns along with other information related to the application database. The physical data model is checked to determine if content of the data definition language file is defined in the physical data model. That is, it is checked whether tables and columns with common values as represented by the join indicator are already defined in the physical data model.

At step 214, if it is determined that the content of the data definition language file is not defined in the physical data model, the data definition language file is identified as representing the hidden relationships in the application database. In an embodiment of the present invention, if it is determined that the relationships between the tables and columns are not defined in the physical data model, the data definition language file is marked as 'missing'. The data definition language files marked as 'missing' are appended to corresponding database query language statements. The appended data definition language files identifies the tables and columns with common values in the application database as the hidden relationships.

At step 216, if it is determined that the content is defined in the physical data model, no action is taken.

At step 218, steps 202 to 214 are repeated until there are no more database query language statements that need to be parsed from the log table.

At step 220, logical data definition language file is generated based on the data definition language file for a logical data model. In an embodiment of the present invention, the logical data definition language file includes the missing or hidden relationships of the identified tables in addition to the existing relations defined at the data layer.

At step 222, the logical data model is updated based on the content of the logical data definition language file. In an embodiment of the present invention, the logical data model represents the enterprise entities, their data and relationship among them, and is independent of the application database information. The logical data model is updated with the information in the logical data definition language file such that logical relationship of the tables and columns are defined, whose relationship information is not available in the physical data model.

At step 224, logical relationship information of tables and columns are displayed based on the updated logical data model. In an embodiment of the present invention, the data modeling system presents the newly discovered information to the user in the logical data model. Based on the displayed data, test data management experts obtain information related to hidden relationships of various tables and columns in the application database to generate complete and accurate data for performing testing activities for the application. In an exemplary embodiment of the present invention, application subject matter experts or architect may validate the newly found relationships and configure the hidden relationships identified in the application database into the physical data model if needed.

Therefore, in accordance with various embodiments of the present invention, the system 102 facilitates providing hidden information of data stored in the database, that are not defined in the database layer of an application architecture.

Figure 3:
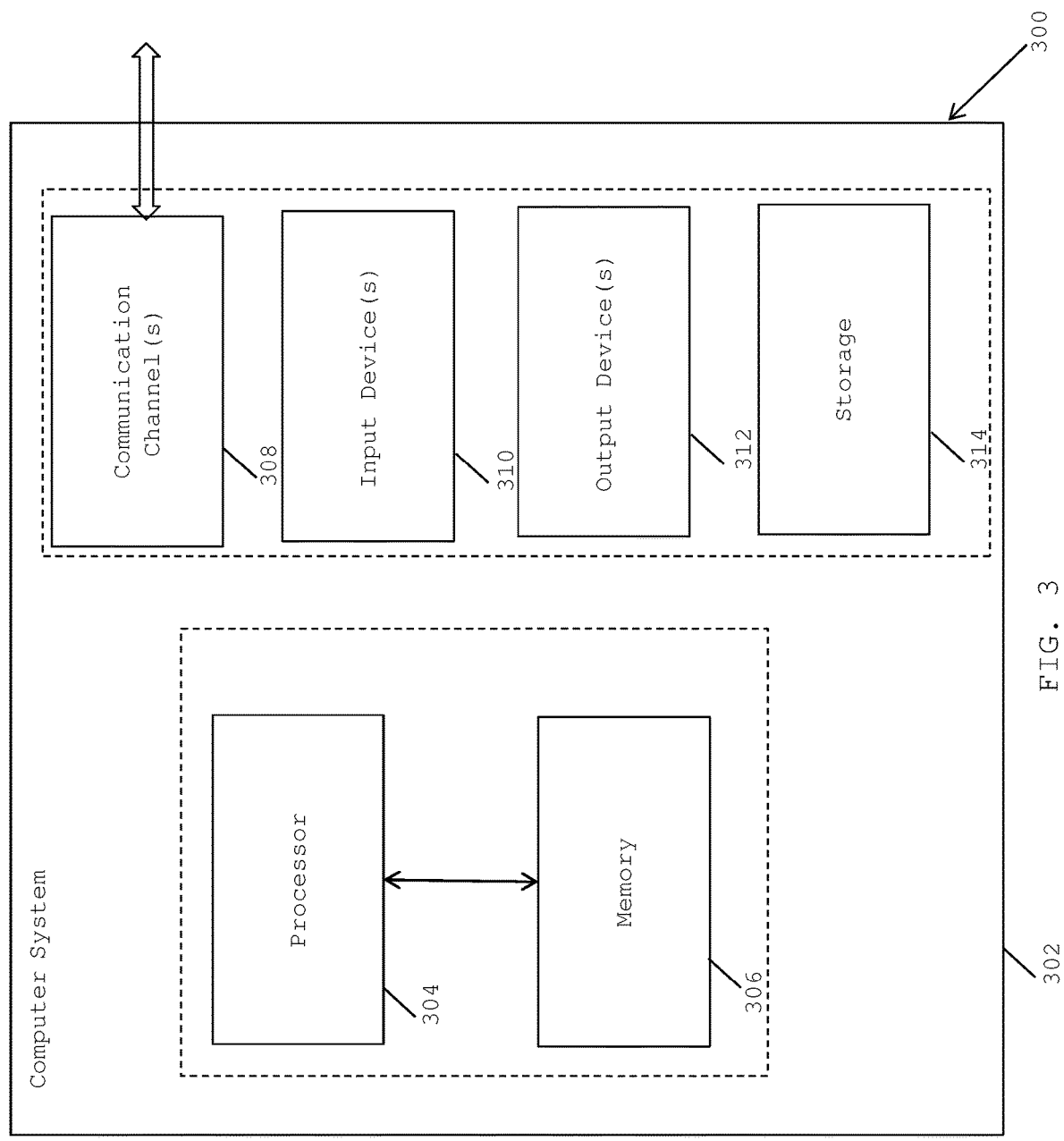
FIG. 3 illustrates an exemplary computer system in which various embodiments of the present invention may be implemented.

FIG. 3 illustrates an exemplary computer system in which various embodiments of the present invention may be implemented.

The computer system 302 comprises the programmed processor 304 and the memory 306 and as a result has modified functioning capabilities, as defined by various embodiments of the present invention, as compared to a general purpose computer. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the processor 304 executes program instructions stored in the memory and is a real processor. The memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for identifying and analyzing hidden relationships in application databases, via a database trace and analysis tool in communication with a processor that is programmed to execute program instructions of the database trace and analysis tool stored in a memory, the method comprising:
   (a) analyzing one or more database query language statements, during a database session, to identify a join indicator representative of data fields from two or more tables which are joined using a value that is common to each data field, wherein the join indicator is identified in each of the one or more database query language statements retrieved from one or more log tables in an application database;
   (b) generating a data definition language file based on the identified join indicators of the database query language statements, wherein the data definition language includes relationship between the two or more tables;
   (c) repeating steps (a) and (b) until all the database query language statements in the log tables are analyzed;
   (d) ascertaining a relationship between the two or more tables as a hidden relationship if content of the created data definition language file is not defined in a database schema of the application database, the database schema being represented in a physical data model;
   (e) appending the data definition language file to corresponding database query language statement in an event the hidden relationship is ascertained; and
   (f) generating a logical data definition language file, based on the generated data definition language file, if the hidden relationship is ascertained so as to update a logical data model with the content of the logical data definition language file, whereby the logical data model represents hidden relationships between the two or more tables in the application database.

2. The method of claim 1, further comprising monitoring the application database during the database session to trace database query language statements associated with one or more transactions carried out during the database session.

3. The method of claim 2, further comprising:
   retrieving one or more log files generated in the application database in response to the trace, the one or more log files including database query language statements corresponding to one or more transactions during the database session; and
   loading contents of the one or more log files into the one or more log tables in the application database.

4. The method of claim 1, wherein the step of analyzing the one or more database query language statements comprises parsing the database query language statements to identify the join indicator.

5. The method of claim 1, wherein the step of generating the data definition language file further comprises a step of appending the generated data definition language file to corresponding database query language statements.

6. The method of claim 1, wherein the logical data definition language file represents the hidden relationship between the tables and existing relationships between tables that are defined in the database schema.

7. A system for identifying and analyzing hidden relationships in application databases, the system in communication with at least one application database and a data modeling system, the system comprising:
   a processor executing program instructions stored in a memory;
   a data analysis engine in communication with the processor and configured to:
      analyze one or more database query language statements, during a database session, to identify a join indicator representative of data fields from two or more tables which are joined using a value that is common to each data field, wherein the join indicator is identified in each of the one or more database query language statements retrieved from one or more log tables in an application database;
      generate a data definition language file, based on the identified join indicators of the database query language statements, wherein the data definition language includes relationship between the two or more tables; and
      ascertain a relationship between the two or more tables as a hidden relationship if content of the created data definition language file is not defined in a database schema of the application database which is represented in a physical data model,
      append the data definition language file to corresponding database query language statement in an event the hidden relationship is ascertained;
      wherein the data analysis engine is configured to perform the analysis and generation until all the database query language statements in the log tables are analyzed; and
   a logical data definition language generation engine in communication with the processor and configured to generate a logical data definition language file, based on the generated data definition language file, if the hidden relationship is ascertained so as to update a logical data model, in the data modeling system, with the content of the logical data definition language file, whereby the logical data model represents hidden relationships between tables in the application database.

8. The system of claim 7, further comprises a data tracing engine in communication with the processor and configured to monitor the application database during the database session to trace database query language statements associated with one or more transactions carried out during the database session.

9. The system of claim 8, wherein the data tracing engine is further configured to:
retrieve one or more log files generated in the application database in response to the trace, the one or more log files including database query language statements corresponding to one or more transactions during the database session; and
load contents of the one or more log files into the one or more log tables in the application database.

10. The system of claim 7, wherein the data analysis engine is configured to analyzing the database query language statements by parsing the database query language statements to identify the join indicators.

11. The system of claim 7, wherein the data analysis engine is further configured to append the generated data definition language file to corresponding database query language statements.

12. A computer program product, comprising:
a non-transitory computer-readable medium having computer-readable program code stored thereon, the computer-readable program code comprising instructions that, when executed by a processor, cause the processor to:
(a) analyze one or more database query language statements, during a database session, to identify a join indicator representative of data fields from two or more tables which are joined using a value that is common to each data field, wherein the join indicator is identified in each of the one or more database query language statements retrieved from one or more log tables in an application database;
(b) generate a data definition language file based on the identified join indicators of the database query language statements, wherein the data definition language includes relationship between the two or more tables;
(c) repeat steps (a) and (b) until all the database query language statements in the log tables are analyzed;
(d) ascertain a relationship between the two or more tables as a hidden relationship if content of the created data definition language file is not defined in a database schema of the application database which is represented in a physical data model;
(e) append the data definition language file to corresponding database query language statement in an event the hidden relationship is ascertained; and
(f) generate a logical data definition language file, based on the created data definition language file, if the hidden relationship is ascertained so as to update a logical data model with the content of the logical data definition language file, whereby the logical data model represents hidden relationships between the two or more tables in the application database.

* * * * *